United States Patent
Meola

(10) Patent No.: US 8,943,415 B2
(45) Date of Patent: Jan. 27, 2015

(54) THIRD PARTY CONTROL OF LOCATION INFORMATION ACCESS

(75) Inventor: Aaron George Meola, Snoqualmie, WA (US)

(73) Assignee: Microsoft Corporation, Redmond, WA (US)

( * ) Notice: Subject to any disclaimer, the term of this patent is extended or adjusted under 35 U.S.C. 154(b) by 473 days.

(21) Appl. No.: 12/684,575

(22) Filed: Jan. 8, 2010

(65) Prior Publication Data

US 2011/0173545 A1 Jul. 14, 2011

(51) Int. Cl.
*G06F 3/00* (2006.01)
*G06F 21/62* (2013.01)
*G06F 15/177* (2006.01)

(52) U.S. Cl.
CPC .... *G06F 21/6218* (2013.01); *G06F 2221/2111* (2013.01); *G06F 2221/2141* (2013.01); *G06F 2221/2149* (2013.01)
USPC ........... 715/743; 715/736; 715/740; 715/741; 715/742; 715/760

(58) Field of Classification Search
USPC .......... 715/700, 735, 736, 740–743, 760, 764
See application file for complete search history.

(56) References Cited

U.S. PATENT DOCUMENTS

| | | | |
|---|---|---|---|
| 6,202,023 B1 * | 3/2001 | Hancock et al. | 701/516 |
| 6,594,483 B2 * | 7/2003 | Nykanen et al. | 455/411 |
| 6,738,808 B1 * | 5/2004 | Zellner et al. | 709/223 |
| 7,046,139 B2 | 5/2006 | Kuhn et al. | |
| 7,353,034 B2 * | 4/2008 | Haney | 455/457 |
| 7,403,785 B2 * | 7/2008 | Daniels et al. | 455/456.3 |
| 7,999,728 B2 * | 8/2011 | Chen et al. | 342/357.25 |
| 8,000,726 B2 * | 8/2011 | Altman et al. | 455/456.3 |
| 8,050,690 B2 * | 11/2011 | Neeraj | 455/456.1 |
| 2005/0204014 A1 | 9/2005 | Yao et al. | |
| 2006/0105838 A1 * | 5/2006 | Mullen | 463/31 |
| 2007/0150918 A1 | 6/2007 | Carpenter et al. | |
| 2007/0264974 A1 * | 11/2007 | Frank et al. | 455/411 |
| 2007/0282678 A1 * | 12/2007 | Dendi et al. | 705/14 |
| 2008/0070593 A1 * | 3/2008 | Altman et al. | 455/457 |
| 2008/0189364 A1 * | 8/2008 | Landon et al. | 709/204 |
| 2008/0207137 A1 * | 8/2008 | Maharajh et al. | 455/74 |
| 2009/0089882 A1 | 4/2009 | Hofmann et al. | |
| 2009/0113472 A1 * | 4/2009 | Sheth et al. | 725/34 |
| 2009/0172782 A1 | 7/2009 | Taglienti et al. | |

(Continued)

FOREIGN PATENT DOCUMENTS

CN 1749914 A 3/2006

OTHER PUBLICATIONS

Verizon Wireless drops Chaperone for Family Locator, Sep. 16, 2009, 2 pages.*

(Continued)

*Primary Examiner* — Matt Kim
*Assistant Examiner* — Yongjia Pan
(74) *Attorney, Agent, or Firm* — Timothy Churna; Kate Drakos; Micky Minhas

(57) ABSTRACT

Controlling access to location information by entities hosted by an execution extension environment. After receiving a request from the entity for location information associated with a computing device, access rights of the entity for the requested location information are accessed. A request is sent to another computing device to determine whether to authorize access by the entity to the requested location information. Based on a response from the other computing device, access to the requested location information is enabled.

20 Claims, 4 Drawing Sheets

(56) References Cited

U.S. PATENT DOCUMENTS

2009/0265236 A1* 10/2009 Schultz et al. ............. 705/14
2009/0265764 A1* 10/2009 Schultz et al. ............. 726/4
2010/0127921 A1* 5/2010 Chen et al. ............. 342/357.07

OTHER PUBLICATIONS

Android Security, Feb. 13, 2009, 7 pages.*
"Parents Beware: Google iPhone App Maps User's Locations", Retreived at<<http://www.networkworld.com/community/node/43838>>, Jul. 24, 2009, pp. 3.
Wilde Erik, "Location Management for Mobile Devices", Retreived at<<http://dret.net/netdret/docs/wilde-irep08-016-mobile-location.pdf>>, Feb. 2008, pp. 13.
Marmasse, et al., "Safe & Sound: A Wireless Leash", Retreived at<<http://www.media.mit.edu/speech/papers/2003/marmasse__CHI03__Safe__And__Sound.pdf>>, CHI 2003, Apr. 5-10, 2003, pp. 2.
"First Office Action", Mailed Date: May 6, 2013, Application No. 201110008519.0, Filed Date: Jan. 7, 2011, pp. 13.
"Second Office Action", Mailed Date: Nov. 6, 2013, Application No. 201110008519.0, Filed Date: Jan. 7, 2011, pp. 4.

* cited by examiner

THIRD PARTY CONTROL OF LOCATION INFORMATION ACCESS

BACKGROUND

Existing application programs such as web browsers include or host executable code from third parties. The executable code allows the third parties to, for example, access resource and/or collect data available from the computing device. Although such existing application programs often provide enhanced user experiences, these application programs also raise security and privacy issues. For example, existing mobile computing devices such as cellular telephones or personal digital assistants (PDA) have global positioning system (GPS) capabilities. Executable code on these devices may include programs or scripts (e.g., such as executed by a web browser) designed to request or even steal vulnerable information such as location information (e.g., global positioning system information) from the mobile computing device.

Some existing systems include separate, layered access policy rules for controlling access by application programs to device resources. For example, if a user authorizes a browser to access particular resources on a mobile computing device and if the browser exposes that capability to web pages, then every web page (malicious or not) rendered by the browser has access to the particular resources. Additionally, operating systems within the existing systems may also provide a policy system to administer these access constraints. However, the existing systems lack, among other things, more granular control over access to the resources.

SUMMARY

Embodiments of the disclosure manage access by an entity associated with an execution extension environment to location information on a first computing device. Upon a request for location information of a first mobile computing device form the entity, the access rights of the entity for the requested location information are accessed and a request to authorize the entity access to the requested location information is sent to a second mobile computing device where access to the requested location information is enabled based on a response from the second mobile computing device.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Corresponding reference characters indicate corresponding parts throughout the drawings.

DETAILED DESCRIPTION

Figure 1:
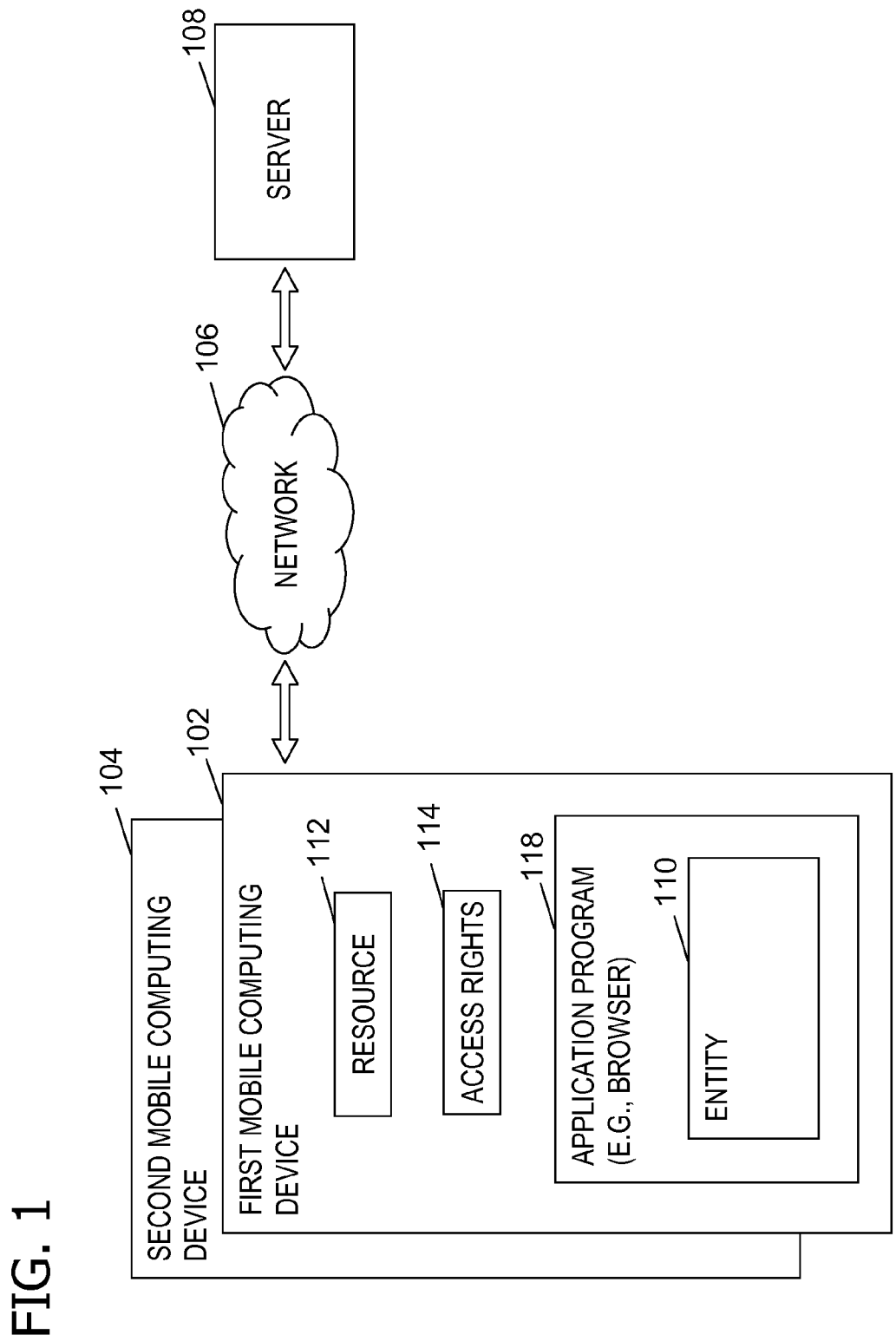
FIG. 1 is an exemplary block diagram illustrating a second computing device providing authorization for an entity to access a resource on a first computing device.

Referring to the figures, embodiments of the disclosure enable a third party to control access rights 114 to a resource 112 (e.g., location information) by an entity 110 executing within an application program 118 (e.g., a global positioning system application program) on a computing device 201. In some embodiments, the application program 118 represents a parent application program executing on a first mobile computing device 102 and the entity 110 represents a child application program or other executable code (e.g., a web page hosted by a browser). The present disclosure enables discrimination among web pages (e.g., the entity 110) requesting access to location information associated with the first mobile computing device 102. Thus, upon a request from the entity 110 to access location information associated with the first mobile computing device 102, a determination is made by the third party as to whether the entity 110 is allowed access to the requested location information or denied access to the requested location information.

For example, a first user (e.g., a child or employee) of the first mobile computing device 102 executing a browser may navigate to a map web site and later navigates to a social networking-related web site. The present disclosure provides a second user (e.g., a parent of the child or a boss of the employee) an ability to authorize, restrict, or refuse access by particular entities to the resource 112. For example, the present disclosure enables the second user to authorize the map web site to have access to the requested location information of the first mobile computing device 102 while refusing access by the social networking related web site to the requested location information associated with the first mobile computing device 102. As such, aspects of the present disclosure enable the second user to create different access rights for the same browser executing on the first mobile computing device 102: a first set of access rights or profile for the map web site and a second set of access rights or profile for the social networking-related web site.

The second user may also selectively restrict access to a particular location of the first mobile computing device 102 based on the current location of the first mobile computing device 102. For example, the second user may allow location information of the first mobile computing device 102 to restrict access if the first mobile computing device 102 (and therefore the first user) is located on school property. At the same time, the second user may provide unlimited access to the location information of the first mobile computing device 102 to family members. Thus, the present disclosure enables a user that has authority (e.g., the second user) over another user (e.g., the first user), an ability to control the access rights 114 of the first mobile computing device 102 associated with the first user.

While some embodiments of the disclosure are illustrated and described herein with reference to the first mobile computing device 102 and the second mobile computing device 104 being a mobile computing device such as a mobile telephone, aspects of the disclosure are operable with any device that performs the functionality illustrated and described herein, or its equivalent. For example, embodiments of the disclosure are operable with netbooks, desktop computing devices, laptop computers, portable gaming consoles and other computing devices. In such embodiments, the access rights may be stored by a cloud service and accessible by any device of a user.

Referring again to FIG. 1, the first mobile computing device 102 is connected to the second mobile computing device 104 and a server 108 via a network 106. In some embodiments, the server 108 is a peer computing device and the first mobile computing device 102 and the peer computing device are in a peer-to-peer relationship. The first mobile computing device stores one or more access rights 114 for the one or more resources 112 including, but not limited to location information (e.g., global positioning system coordinates), documents, and the like. A location provider may communicate with the first mobile computing device 102 and the second mobile computing device 104 through the Internet (e.g., the network 106). Other channels of communication between the location provider and the first mobile computing device 102 and the second mobile computing device 104 are possible. For example, communication may occur via the short message service (SMS). In another example, the location provider may communicate with the first mobile computing device 102 and the second mobile computing device 104 through local area networks, or direct communication such as land-based lines or wireless telephone connections. Thus, while FIG. 1 illustrates communication via the network 106, it is for illustrative purposes only, and not intended to be a limitation on the present disclosure.

One or more application programs 118 such as a web browser execute on the first mobile computing device 102 and provide an execution environment for other executable code such as hosted entities, one or more child application programs (e.g., nested or not), or any other executable code associated with the application programs 118. While the entity 110 is shown in FIG. 1 to be within or hosted by the application program 118, the entity 110 may be located separate from the first mobile computing device 102.

Figure 2:
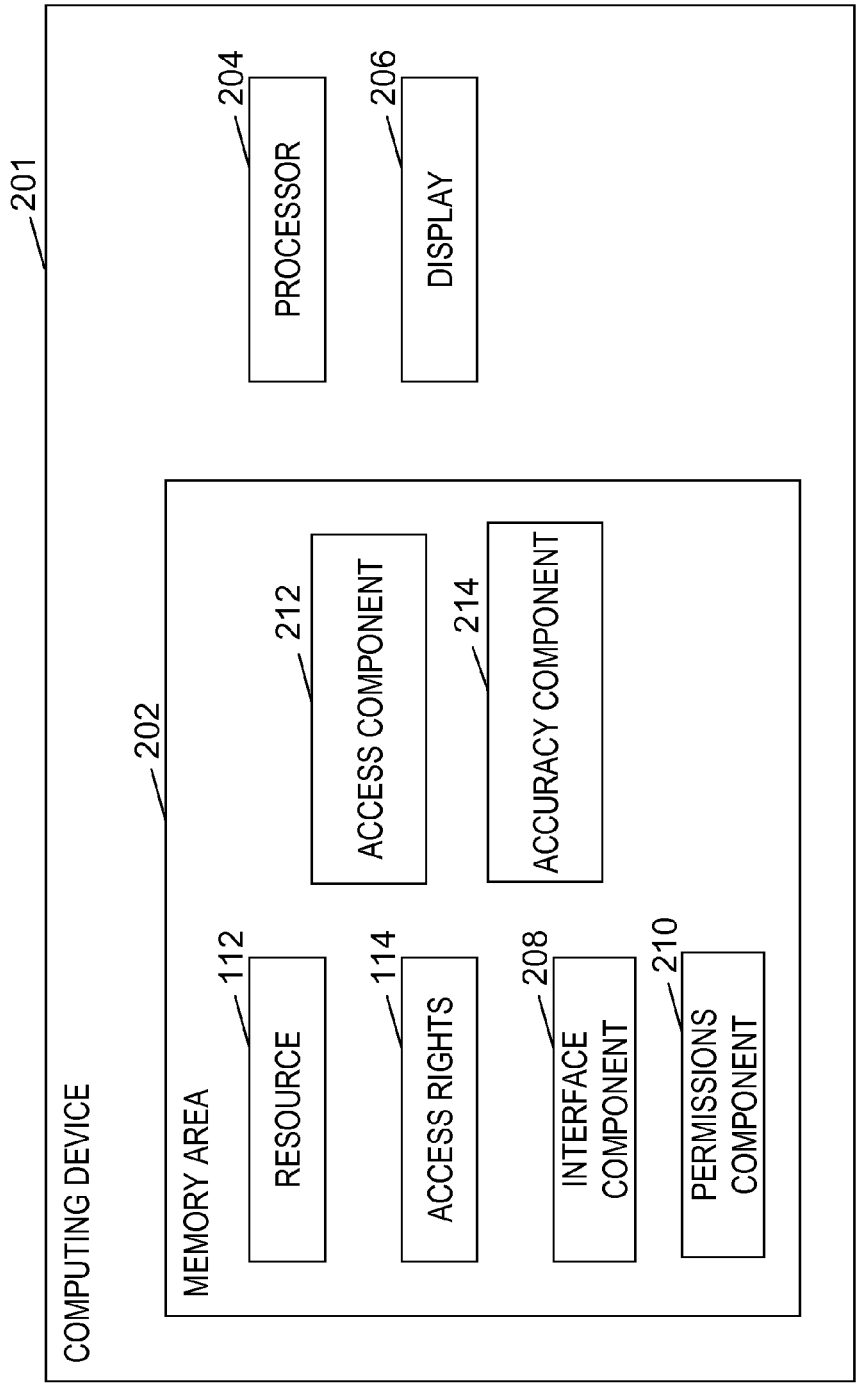
FIG. 2 is an exemplary block diagram of a computing device having a memory area storing components for controlling access rights to location information.

Referring next to FIG. 2, an exemplary block diagram illustrates a computing device 201 (such as the first mobile computing device 102 or other first computing device) having a memory area 202, at least one processor 204, and a display 206. The display 206 may be, for example, a display device separate from the computing device 201, a display integrated into the computing device 201 (e.g., such as in a mobile telephone), a capacitive touch screen display, or a non-capacitive display. User input functionality may also be provided in the display 206, where the display 206 acts as a user input selection device such as in a touch screen. While FIG. 2 is an exemplary block diagram of the computing device 201, one or more additional computing devices in communication with the computing device 201 may also include similar features described herein.

In some embodiments, the memory area 202, or other computer-readable medium or media, stores the resources 112 and the access rights 114, and the application program 118 hosts the entity 110 seeking access to the resource 112. In other embodiments, the resources 112, such as a GPS receiver using BLUETOOTH brand wireless communication, exist external to the computing device 201. An entity identifier associated with the entity 110 may be used to determine whether to provide access to one or more of the resources 112.

To control access to the resources 112, each request for the resource 112 is evaluated against the access rights 114. In an example, the resource 112 is a location resource (e.g., providing location information describing the computing device 201). The access rights 114 identify the type and depth of access by the entity 110 to the resource 112. In one embodiment, the entity 110 may have read only access, read/write access, or no access to the resource 112. In a further embodiment, the access rights 114 may include a request to delegate the decision regarding access to the resources 112 to a second user (e.g., a parent) via another computing device (e.g., a second computing device) such as the second mobile computing device 104 from FIG. 1. For example, upon a request from the entity 110 to access location information of the computing device 201, the second user may be prompted to authorize or deny access to the location information of the computing device 201. The authorization request may be sent by various means including, but not limited to, SMS, email, automated voice message, or an application built into the other computing device. In one embodiment the type of information describing the entity 110 making the request or any other information the second user deems relevant, is determined by the second user via the other computing device. For example, the second user may prefer authorization requests to identify information regarding, for example, the name of the requesting entity, the location of the computing device 201, an indication as to whether a request was sent and/or received from an additional mobile computing device (e.g., the other parent), and a quantity of times the particular request has been made. In one embodiment, the first user is prompted with a message on the first mobile computing device that authorization has been sent to the second mobile computing device and/or authorization is pending.

While the access rights 114 shown in FIG. 2 are stored in the memory area 202 on the computing device 201, one or more of the access rights 114 may be stored remotely from the computing device 201. For example, the access rights 114 may be stored in a cloud service (not shown), a database or other memory area accessible by the computing device 201.

The memory area 202 further stores one or more computer-executable components. Exemplary components include, but are not limited to an interface component 208, a permissions component 210, an access component 212, and an accuracy component 214. The components may be individual components in some embodiments, or grouped together into a single component in other embodiments. While the components are shown to be stored in the memory area 202, the components may be stored and executed from a memory area remote from the computing device 201. For example, the components may be stored by a cloud service, and the output of the execution of the components may be provided to the computing device 201. Such embodiments reduce the computational and storage burden on the computing device 201.

The interface component 208, when executed by the processor 204, causes the processor 204 to communicate with the other computing device to obtain data that defines the access rights 114. For example, the interface component 208 receives input from the other computing device that defines, for example, an expiration value for the access rights 114 (e.g., yes for one year, or no during school hours). In the present example, the second user associated with the other computing device may specify that the access rights 114 are based on geographic and/or time-based restrictions such that location information of the computing device 201 is provided if the location of the first user is within (or without) a prescribed geographic area when a location request is received that falls within a time-based restriction parameter contained in the access rights 114. In another example, the second user may enable access to the requested location information if the first user is within a predefined distance from the second user.

Further, the second user may specify that the access rights 114 are only for the current request, a current session, or for a defined period of time (e.g., a day, the next ten days, five minutes, or any other user-specified period of time). In one embodiment, the interface component 208 includes one or more user interfaces for receiving user input from a user via a keyboard, touch display, mouse, or other user input selection devices. Thus, the interface component 208 may include a user interface to receive direct user input to define the access rights 114.

The permissions component 210, when executed by the processor 204, causes the processor 204 to receive, identify, or otherwise access one or more of the access rights 114. The permissions component 210 may also store and maintain some or all the access rights 114.

The access component 212, when executed by the processor 204, causes the processor 204 to receive a request for the resource 112 from the entity 110, compare the received request to the access rights 114 received by the permissions component 210, and grant the entity 110 access to the resource 112 based on the comparing. For example, the access component 212 compares the received request to each of the access rights 114 available to the permissions component 210. If a match is found (e.g., one of the access rights 114 matches the received request), the access component 212 evaluates and applies the access rights 114. If, however, access rights are not found in the access rights 114, the access component 212 communicates with the interface component 208 to prompt the second user via the other computing device to define the access rights 114. For example, the prompt seeks to obtain authorization from the second user to enable the entity 110 access the resource 112 on the computing device 201. The prompt may also provide a "never allow access" option to persist the access rights 114 received from the user, an "always allow access" option, or an option for allowing access for a defined time period (e.g., two weeks). In such an instance, a new policy set is created and stored in the memory area 202 with the other access rights 114.

The accuracy component 214, when executed by the processor 204, causes the processor 204 to define a level of accuracy of the requested location information exposed to the entity 110. For example, if is determined by, for example, by the second user via the access rights 114 that the accuracy of the requested location information needs to be reduced, then the accuracy component 214 reduces (e.g., "fuzzes") the accuracy of the requested location information.

The processor 204 executes computer-executable instructions for implementing aspects of the disclosure. For example, the processor 204 receives, from the second user for example, the access rights 114 to the resource 112, and associates the received access rights 114 with the entity 110. The processor 204 operates to store the created access rights in the memory area 202.

In some embodiments, the processor 204 is transformed into a special purpose microprocessor by executing computer-executable instructions or by otherwise being programmed. For example, the processor 204 is programmed with instructions such as illustrated next in FIG. 3.

Figure 3:
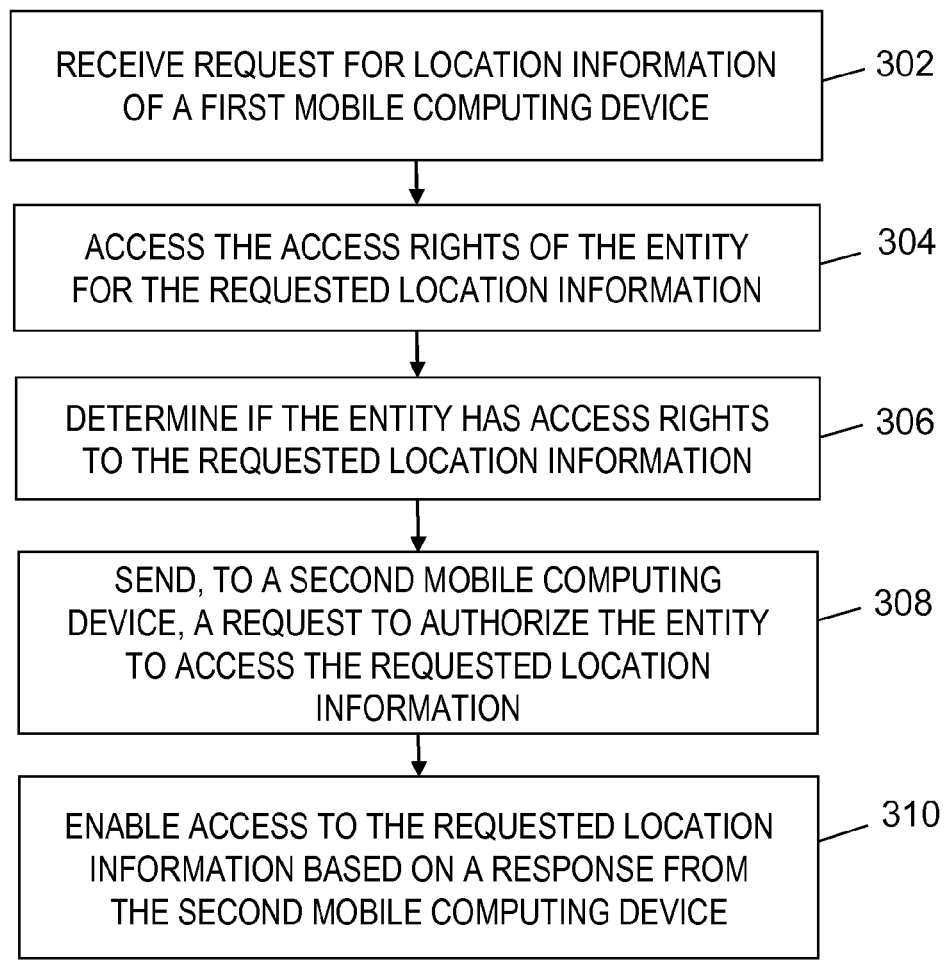
FIG. 3 is an exemplary flow chart illustrating a process for controlling access to location information of a mobile computing device.

Referring next to FIG. 3, an exemplary flow chart illustrates access control for the resource 112. While described with reference to the first mobile computing device 102 and the second mobile computing device 104, the operations illustrated in FIG. 3 are applicable to computing devices other than mobile computing devices. At 302, a request for location information of the first mobile computing device 102 is received. In some embodiments, the access rights 114 also include data defining what information the entity 110 is authorized to obtain from the resource 112 and which purposes for the data are authorized. For example, as mentioned above, the second user may specify via the second mobile computing device 104, access rights regarding if and when a particular web site may obtain location information about the first mobile computing device 102.

At 304, the access rights 114 of the entity to the requested location information are accessed. The access rights 114 identify the type and depth of access by the entity 110 to the resource 112. In one embodiment, the access rights 114 may be predefined by the second user based on, for example, a type of entity making a request for location information, a day of the week, a time of day, and a location of the first mobile computing device 102. Thus, the second user may restrict all access to the requested location information during school hours, and allow access to the requested location information to specific entities outside of school hours. The second user may also enable or restrict access to the requested location information based on a proximity of the first mobile computing device 102 to the second mobile computing device 104. For example, the second user may enable access to any requested location information if the first mobile computing device is within a predefined distance from the second mobile computing device 104. In a further embodiment, the second user may require that all requests for location information be sent to the second mobile computing device 104 before access is granted or denied. Thus, upon a request from the entity 110 to access location information of the first mobile computing device 102, the second user is prompted via the second mobile computing device 104 to authorize or deny access to the location information of the first mobile computing device 102.

For example, at 306, a determination is made as to whether the entity 110 has access to the requested location information. The access rights 114 are examined to determine whether to grant or deny access by the entity 110 to the resource 112. In one embodiment, the entity 110 is granted access to the resource 112 based on the determination. For example, if the access rights 114 indicate that the entity 110 is allowed to access the resource 112, the request is granted. Alternatively, if the access rights 114 specify that the entity 110 should not be allowed access, the request is denied. The absence of a matching access rights may indicate that the request should be denied. For example, if a matching access right is not identified, the entity 110 is denied access to the resource 112. However, if a matching access right is not identified, access to the requested location information may be enabled or restricted based on a previous response from the second mobile computing device 104 at 308. At 310, access to the requested location information based on a response from the second mobile computing device 104 is enabled.

In some embodiments, if the second user authorizes access, a new access right is added to the access rights 114. Therefore, in a subsequent check for access by the same application program 118 with the same entity 110 to the same resource 112, the access right is matched first and access is granted or denied based upon the previous response from the second user. Upon a denial, a first user may send a message to the second user regarding why access should be granted and request reconsideration of the decision. The message may be sent by SMS, email, automated voice message, an application built into the second mobile computing device 104, or other forms and means of communication.

In some embodiments, if a response from the second user via the second mobile computing device 104 is not received within a predefined period of time, then a request for authorization may be sent to another user, for example, a designated contact identified by the second user.

Figure 4:
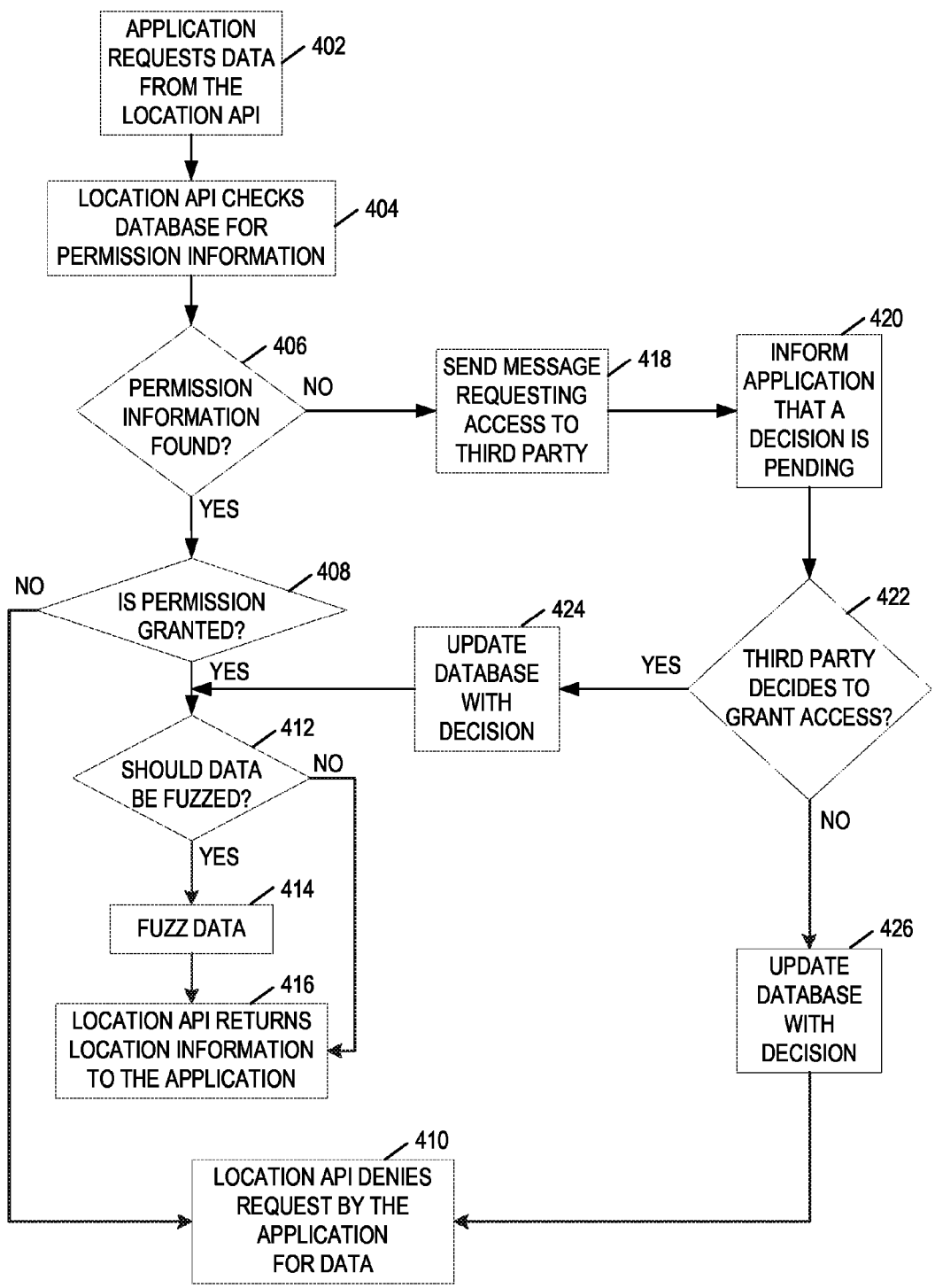
FIG. 4 is an exemplary flow chart illustrating a process for controlling access to location information of a first mobile computing device from a second mobile computing device.

Referring next to FIG. 4, an exemplary flow diagram illustrates an alternative embodiment of the disclosure. In this example, controlling access to location information on the first mobile computing device 102 can be implemented into a location application programming interface (API) executed on the first mobile computing device 102. In this example, the location API obtains and provides location information to a requesting application program (e.g., the entity 110). Thus, in one embodiment, an API available on the first mobile computing device 102 can be modified to control access to a resource (e.g., location information) on the first mobile computing device 102.

For example, at 402 the application program requests location information from the location API on the first mobile computing device 102. Upon receiving the request, the location API checks a database (e.g., the access rights 114) for permission to access the requested location information at 404. At 406, if permission information is found, at 408 it is determined whether permission to access the requested location information is granted. If it is determined from the permission information that access to the requested location information is not granted, at 410, the location API denies the request by the application to access the requested location information. However, at 408, if it is determined that permission to access the requested location information is granted, at 412, it is determined whether the accuracy of the requested location information is going to be reduced or "fuzzed." For example, in one embodiment, a parent, via the mobile computing device 104, can specify a level of granularity of the location information of the first mobile computing device 102 that is given to a requesting application. Thus, if it is determined that the accuracy of the requested location information is going to be fuzzed, at 414, the accuracy of the location information is reduced or degraded via, for example, the accuracy component 214. On the other hand, if it is determined that the requested location information is not going to be adjusted, at 416, the location API provides the requested location information to the requesting application without performing any degrading or fuzzing.

In embodiments, if permission to access the requested location information is not found, at 418, a message is sent from the first mobile computing device 102 to a third party (e.g., the second mobile computing device 104) requesting permission to allow the requesting application access to the requested location information. In one embodiment, the message includes additional information, such as, "you said yes last time" or "Dad said it was ok." In this example, the child can personalize the message sent to the parent either manually or by enabling an option on the first mobile computing device 102 that tracks such previous authorizations and/or denials and automatically formulates a personalized message.

At 420, the requesting application is notified that a decision to grant the application access to the requested location information is pending. At 422, if it is determined that the third party grants access to the requested location information, at 424, the access rights 114 are updated to reflect the decision to grant access to the requested location information, and, at 412, it is determined whether the requested location information is going to be fuzzed. In contrast, if at 422 it is determined that the third party did not grant access to the requested location information, at 426, the access rights 114 are updated to reflect the decision to not grant access to the requested location information, and at 410, the location API denies the requesting application access to the requested location information. In embodiments, the decision by the third party to grant or not grant access to the requested location information may include further information indicating that the current decision to grant or not grant access to the requested location information is applicable for the current request, a current session, and/or for a defined period of time (e.g., a day, the next ten days, five minutes, or any other user-specified period of time).

Exemplary Operating Environment

A computer or computing device such as described herein has hardware including one or more processors or processing units, system memory, and some form of computer readable media. By way of example and not limitation, computer-readable media comprise computer storage media and communication media. Computer storage media include volatile and nonvolatile, removable and non-removable media implemented in any method or technology for storage of information such as computer readable instructions, data structures, program modules or other data. Communication media typically embody computer readable instructions, data structures, program modules, or other data in a modulated data signal such as a carrier wave or other transport mechanism and include any information delivery media. Combinations of any of the above are also included within the scope of computer readable media.

The computer may operate in a networked environment using logical connections to one or more remote computers, such as a remote computer. Although described in connection with an exemplary computing system environment, embodiments of the disclosure are operational with numerous other general purpose or special purpose computing system environments or configurations. The computing system environment is not intended to suggest any limitation as to the scope of use or functionality of any aspect of the disclosure. Moreover, the computing system environment should not be interpreted as having any dependency or requirement relating to any one or combination of components illustrated in the exemplary operating environment. Examples of well known computing systems, environments, and/or configurations that may be suitable for use with aspects of the disclosure include, but are not limited to, personal computers, server computers, hand-held or laptop devices, multiprocessor systems, microprocessor-based systems, set top boxes, programmable consumer electronics, mobile telephones, network PCs, minicomputers, mainframe computers, distributed computing environments that include any of the above systems or devices, and the like.

Embodiments of the disclosure may be described in the general context of computer-executable instructions, such as program modules, executed by one or more computers or other devices. The computer-executable instructions may be organized as software into one or more computer-executable components or modules. Generally, program modules include, but are not limited to, routines, programs, objects, components, and data structures that perform particular tasks or implement particular abstract data types. Aspects of the disclosure may be implemented with any number and organization of such components or modules. For example, aspects of the disclosure are not limited to the specific computer-executable instructions or the specific components or modules illustrated in the figures and described herein. Other embodiments of the disclosure may include different computer-executable instructions or components having more or less functionality than illustrated and described herein. Aspects of the disclosure may also be practiced in distributed computing environments where tasks are performed by remote processing devices that are linked through a communications network. In a distributed computing environment, program modules may be located in both local and remote computer storage media including memory storage devices.

The embodiments illustrated and described herein as well as embodiments not specifically described herein but within the scope of aspects of the disclosure constitute exemplary means for controlling access by the entity 110 to the resource 112, and exemplary means for managing the created access rights 114 stored in the memory area 202.

The order of execution or performance of the operations in embodiments of the disclosure illustrated and described herein is not essential, unless otherwise specified. That is, the operations may be performed in any order, unless otherwise specified, and embodiments of the disclosure may include additional or fewer operations than those disclosed herein. For example, it is contemplated that executing or performing a particular operation before, contemporaneously with, or after another operation is within the scope of aspects of the disclosure.

When introducing elements of aspects of the disclosure or the embodiments thereof, the articles "a," "an," "the," and "said" are intended to mean that there are one or more of the elements. The terms "comprising," "including," and "having" are intended to be inclusive and mean that there may be additional elements other than the listed elements.

Having described aspects of the disclosure in detail, it will be apparent that modifications and variations are possible without departing from the scope of aspects of the disclosure as defined in the appended claims. As various changes could be made in the above constructions, products, and methods without departing from the scope of aspects of the disclosure, it is intended that all matter contained in the above description and shown in the accompanying drawings shall be interpreted as illustrative and not in a limiting sense.

What is claimed is:

1. A system for enabling access to location information on a mobile computing device, said system comprising:
    a memory area for storing access rights of an entity to location information of a first mobile computing device, the access rights specifying whether entities have access to location information associated with the first mobile computing device; and
    a processor programmed to:
        receive a first request for the location information associated with the first mobile computing device;
        obtain, from the memory area, the access rights of the entity to the requested location information;
        determine whether the entity is authorized to have access to the requested location information based on the obtained access rights, wherein determining includes considering a previous response from a second mobile computing device, the previous response relating at least to the entity;
        send, to the second mobile computing device, a second request to authorize the entity to access the requested location information if the obtained access rights do not authorize access to the requested location information associated with the first mobile computing device, the entity representing a child application program executing within a parent application program on the first mobile computing device, the second request including information related to previous authorizations, wherein the second request is sent to a third mobile computing device via the second mobile computing device when a response from the second mobile computing device is not received within a predetermined period of time; and
        enable access to the requested location information based on a current response from the second mobile computing device or the third mobile computing device to the sent request.

2. The system of claim 1, wherein the application program comprises a browser and the entity comprises a web page and associated scripts, the processor enabling access by the web page to the requested location information while refusing access by other web pages, the web page and the other web pages being displayed by the same browser on the first mobile computing device.

3. The system of claim 1, wherein the processor is further programmed to associate an expiration value for the access rights.

4. The system of claim 1, wherein the access rights include data defining a purpose for the requested location information.

5. The system of claim 1, further comprising means for controlling access by the entity to the requested location information.

6. The system of claim 1, the processor being further programmed to receive a notification at the first mobile computing device from the second mobile computing device before enabling access to the requested location information, the notification indicating that a decision to authorize the entity to access the requested location information is pending.

7. The system of claim 1, further comprising a user interface configured to request user input from the second mobile computing device to define the access rights.

8. The system of claim 1, wherein the access rights include data for reducing an accuracy of the location information to be collected by the entity.

9. A method comprising:
    receiving, from an entity executing within at least one execution extension environment on a first computing device, a first request for location information of the first computing device, the entity representing a child application program executing within a parent application program on the first computing device;
    accessing access rights of the entity for the requested location information;
    determining, via a processor, if the entity has access to the requested location information, the determining including considering a previous response from a second computing device, the previous response relating at least to the entity;
    sending, to the second computing device, a second request to authorize the entity access to the requested location information based on the determining, the second request including information related to previous authorizations, wherein the second request is sent to a third computing device when a response from the second computing device is not received within a predetermined period of time; and
    enabling access to the requested location information associated with the first computing device based on a current response from the second computing device or the third computing device.

10. The method of claim 9, further comprising receiving user input from the second computing device that defines the access rights.

11. The method of claim 9, further comprising reducing the accuracy of the location information exposed to the entity.

12. The method of claim 9, wherein the access rights are predefined.

13. The method of claim 9, further comprising associating an expiration value with the access rights.

14. The method of claim 9, wherein the execution extension environment comprises a browser and the entity comprises a web page.

15. The method of claim 9, wherein the second request to authorize the entity access to the requested location information is sent by at least one of the following: SMS, email, automated voice message, and an application built into the second computing device.

16. The method of claim 9, wherein the access rights authorize access to the requested location information based on at least one of the following: a type of entity making a request for the location information, a day of the week, a time of day, and a location of the first computing device.

17. One or more computer storage media having computer-executable components, said components comprising:
 an access component that when executed by at least one processor causes the at least one processor to receive, from an entity executing within an application program on a first mobile computing device, a first request for location information associated with the first mobile computing device, the entity representing a child application program executing within a parent application program on the first mobile computing device, the access component further determining whether the entity is authorized to have access to the requested location information, the determining including considering a previous response from a second mobile computing device, the previous response relating at least to the entity;
 a permissions component that when executed by at least one processor causes the at least one processor to send a second request for the location information from the first mobile computing device to the second mobile computing device, the second request including information related to previous authorizations, the permissions component further sending second the request to a third mobile computing device via the second mobile computing device when a response from the second mobile computing device is not received within a predetermined period of time; and
 an interface component that when executed by at least one processor causes the at least one processor to receive user input from the second mobile computing device or the third mobile computing device, wherein the user input comprises access rights for the entity to the location information on the first mobile computing device.

18. The computer storage media of claim 17, wherein the interface component further comprises requesting user input to define an expiration for the access rights.

19. The computer storage media of claim 17, wherein the location information describes a current location of the first mobile computing device.

20. The computer storage media of claim 17, further comprising an accuracy component that when executed by at least one processor causes the at least one processor to reduce accuracy of the location information exposed to the entity.

\* \* \* \* \*